United States Patent [19]
Bayart et al.

[11] Patent Number: 5,926,299
[45] Date of Patent: *Jul. 20, 1999

[54] SYSTEM FOR DISTRIBUTING OPTICAL SIGNALS

[75] Inventors: Dominique Bayart, Clamart; Dominique Chiaroni, Antony, both of France

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/772,515

[22] Filed: Dec. 24, 1996

[30] Foreign Application Priority Data

Dec. 28, 1995 [FR] France ................................. 95 15656

[51] Int. Cl.⁶ .......................... H04B 10/20; H04J 14/00
[52] U.S. Cl. ...................... 359/121; 359/120; 359/134
[58] Field of Search ................................. 359/120–121, 359/134, 160, 178–179, 341

[56] References Cited

U.S. PATENT DOCUMENTS

| | | | |
|---|---|---|---|
| 5,077,728 | 12/1991 | Kaminow | 359/124 |
| 5,245,690 | 9/1993 | Aida et al. | 385/142 |
| 5,510,920 | 4/1996 | Ota | 359/121 |
| 5,563,733 | 10/1996 | Mitsuda et al. | 359/341 |

FOREIGN PATENT DOCUMENTS

| | | | |
|---|---|---|---|
| 0637148A1 | 2/1995 | European Pat. Off. | |
| 2227623 | 8/1990 | United Kingdom | 359/121 |
| 2257320 | 1/1993 | United Kingdom | |
| 2268848 | 1/1994 | United Kingdom | |

OTHER PUBLICATIONS

Yung–Kuang Chen et al, "Hybrid Transmissive Optical Star Couplers with Gain Using Fiber Amplifiers", *IEEE Photonics Technology Letters*, vol. 5, No. 2, Feb. 1, 1993, pp. 230–232.

*Primary Examiner*—Kinfe-Michael Negash
*Attorney, Agent, or Firm*—Sughrue, Mion, Zinn, Macpeak & Seas, PLLC

[57] ABSTRACT

The invention relates to a system for distributing amplified optical signals, the system comprising an optical star coupler having at least two inputs, each input of said coupler being connected to the output of a respective optical amplifier whose input receives an optical signal. According to the invention, said optical amplifiers are optical amplifiers whose gains are kept constant.

6 Claims, 2 Drawing Sheets

SYSTEM FOR DISTRIBUTING OPTICAL SIGNALS

FIELD OF THE INVENTION

The field of the invention is that of transmitting or switching optical signals, and it relates more particularly to a system for distributing amplified optical signals.

The term "distribution system" is used to designate a system employing a distribution element having at least two inputs, as defined below, with each input being connected to the output of an optical amplifier whose input receives an optical signal to be amplified. The optical signals to be amplified are conveyed over optical links, conventionally constituted by optical fibers. Each optical link may optionally convey a plurality of digital transmissions (channels), e.g. in wavelength multiplex or in time multiplex.

The term "distribution element" is used to designate an optical coupler in a star configuration. A star coupler serves to combine the signals applied to its inputs, with each output from the element delivering a signal proportional to the sum of the signals present on its inputs. In general, such an optical coupler has n inputs, and m outputs, and it conveys a transmission channel from an input port to all of the m output ports, with the number m of outputs being independent of the number n of inputs.

BACKGROUND OF THE INVENTION

The problem encountered with present star couplers is that they present relatively high insertion and division losses, which are functions of their order of division. These losses can be compensated by the presence of the above-mentioned amplifiers.

Conventionally, such amplifiers operate under saturation conditions in order to make high output powers available. This serves to correct emission power fluctuation at the other end of the link.

FIG. 1 shows the characteristic Ps=f(Pe) of an optical amplifier operating in saturation, and FIG. 2 shows a characteristic G=f(Pe) of such an optical amplifier where Pe is input power, Ps is output power, and G is gain expressed in dB. The characteristics are given for constant optical pumping power.

In FIG. 1, characteristic 10 shows that for low input power Pe, the output power Ps varies linearly. As the input power Pe increases, the output power Ps presents saturation. The gain G of the amplifier is given by Ps/Pe in the reference optical band, and thus by the slope of the characteristic 10. As mentioned above, the amplifier operates in saturation, and its operating point may be the point 11, for example.

FIG. 2 shows the gain G of an optical amplifier operating in saturation and as a function of input power Pe. The characteristic is referenced 20. As the power of the input signal increases, gain saturates and decreases. Gain compression is thus observed. The operating point is likewise referenced 11.

Optical amplifiers have a considerable response time: a change in input power over a time interval of less than about 10 ms will not be noticed by the amplifier, i.e. its output power will not vary. That is why the input power Pe and the output power Ps are taken into consideration as mean powers. Thus, it is considered that the input power Pe varies when the number of channels conveyed by the corresponding link changes. A change in the number of channels can be the result, in particular, of a drop or a rise in traffic, or of a change in allocation. It can thus be seen that a change in the number of channels gives rise to a change in the output power Ps of the amplifier.

Also, the entire link presents erratic optical noise (white noise). Thus, when only a few optical channels are to be amplified, the input power Pe is low but the gain G is at a maximum, so the noise reaching or created within the amplifier is amplified more than it would be with a larger number of channels to be amplified.

When amplifiers operating in saturation are used upstream from a star coupler, variations in the mean power load of each amplifier are observed as a function of variations in the number of channels conveyed and thus in the total mean power. These amplifiers therefore do not have the same gain and it follows that at the output from a star coupler combining various input ports over various output ports, the signal-to-noise (S/N) ratio of each channel and of each output port (and also its power level) is affected by variations of the load on one or more of the input ports. In other words, when a channel of a port is unused (no data to be transmitted or subscriber silence when transmitting a speech signal), the noise observed on each output port is greater than when that channel is in use. The problem is that a distributor element having a plurality of inputs such as a combiner or a star coupler, serves not only to split the working signal corresponding to a given wavelength and applied to a given input so as to distribute it over the outputs, but also to sum all of the noise levels present on all of the inputs, and the sum is likewise distributed over the various outputs.

One possible solution for remedying that problem (other than not amplifying the optical signals upstream from the distribution element, which would degrade S/N ratio) is to use amplifiers which are not saturated, i.e. in which the input power Pe does not give rise to gain compression.

By way of example, such amplifiers comprise respective short optical fibers subjected to high pumping flux. However, that solution is economically disadvantageous since the performance of such optical amplifiers is limited (gain of only about 10 dB) and they require high levels of pumping power.

OBJECTS AND SUMMARY OF THE INVENTION

A particular object of the present invention is to remedy those drawbacks.

More precisely, one of the objects of the invention is to provide an optical signal distribution system comprising a optical star coupler with an amplifier disposed at each input thereto, in which a drop in the load on an amplifier, i.e. a decrease in the mean power at its input, does not degrade the S/N ratio at the output(s) from the coupler.

This object, and others that appear below, is achieved by a system for distributing amplified optical signals, the system comprising an optical star coupler having at least two inputs, each input of said coupler being connected to the output of a respective optical amplifier whose input receives an optical signal. According to the invention, said optical amplifiers are optical amplifiers whose gains are kept constant.

The gains can be kept constant by servo-controlling the pump powers of the optical amplifiers or by causing the optical amplifiers to operate under lasing conditions. It is also possible to provide an additional transmission channel whose function is to compensate variation in the mean power at the input to an amplifier, with said variation being due to the appearance or the disappearance of one or more communications channels.

It is equally possible for the optical amplifiers used to be fiber amplifiers or semiconductor amplifiers.

BRIEF DESCRIPTION OF THE DRAWINGS

Other characteristics and advantages of the invention appear on reading the following description of a preferred embodiment, given by way of non-limiting illustration, and from the accompanying drawings, in which.

MORE DETAILED DESCRIPTION

Figure 1:
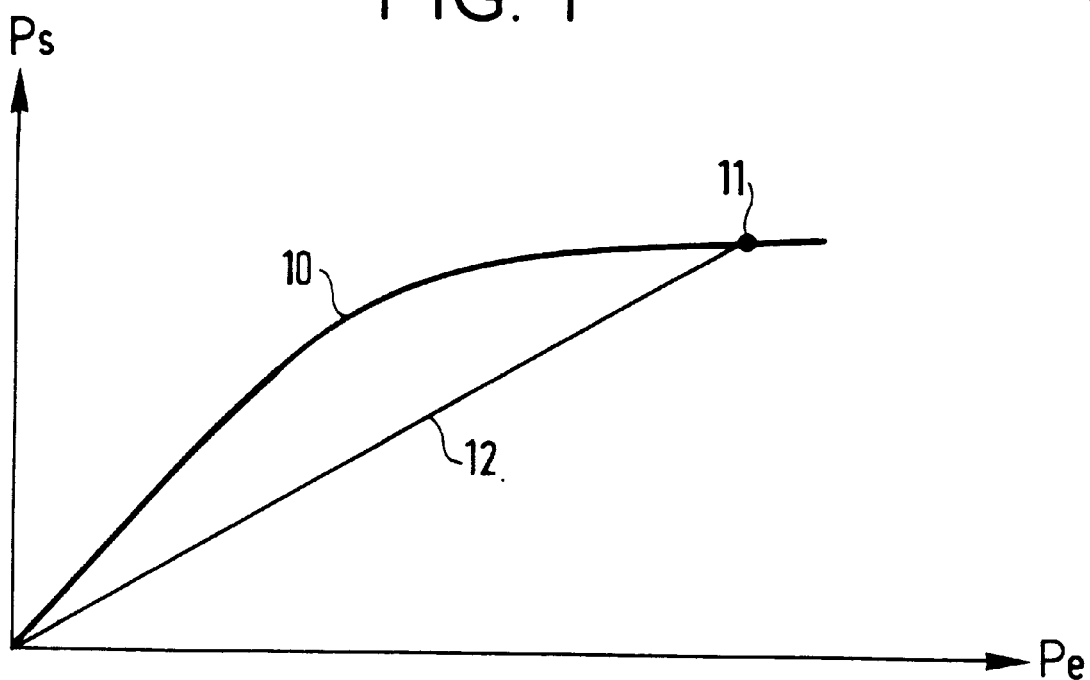
FIG. 1 shows the characteristic Ps=f(Pe) of an optical amplifier operating in saturation.
Figure 2:
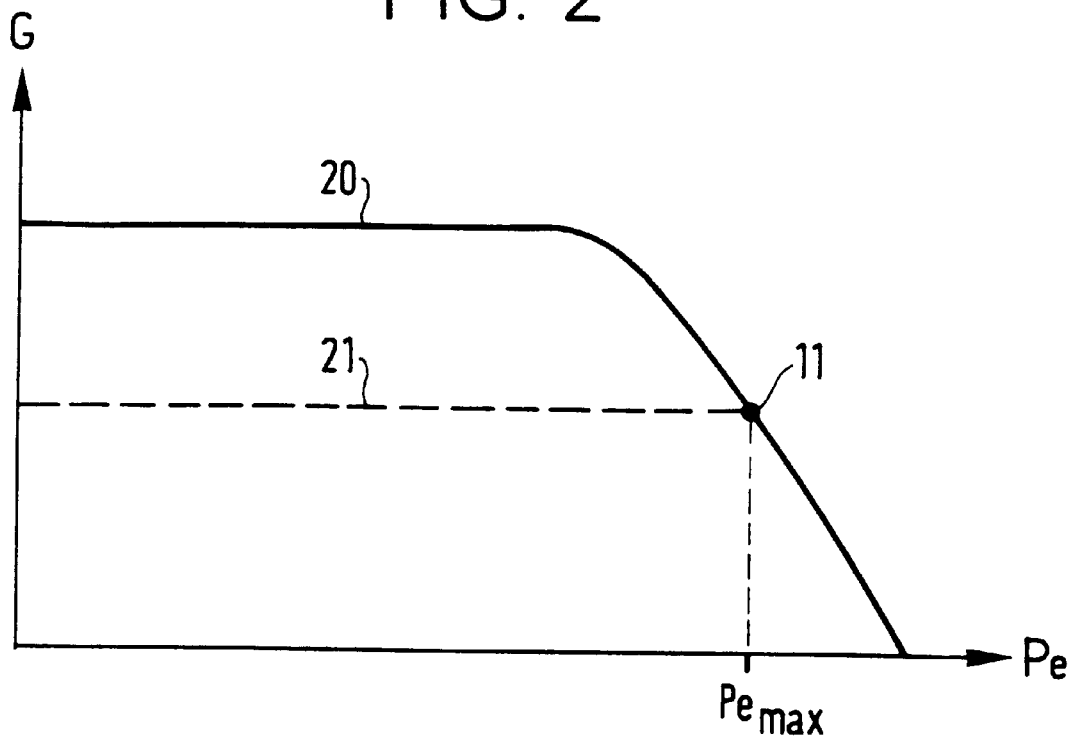
FIG. 2 shows the characteristic G=f(Pe) of an optical amplifier operating in saturation.

FIGS. 1 and 2 are described above with reference to the state of the art.

Figure 3:
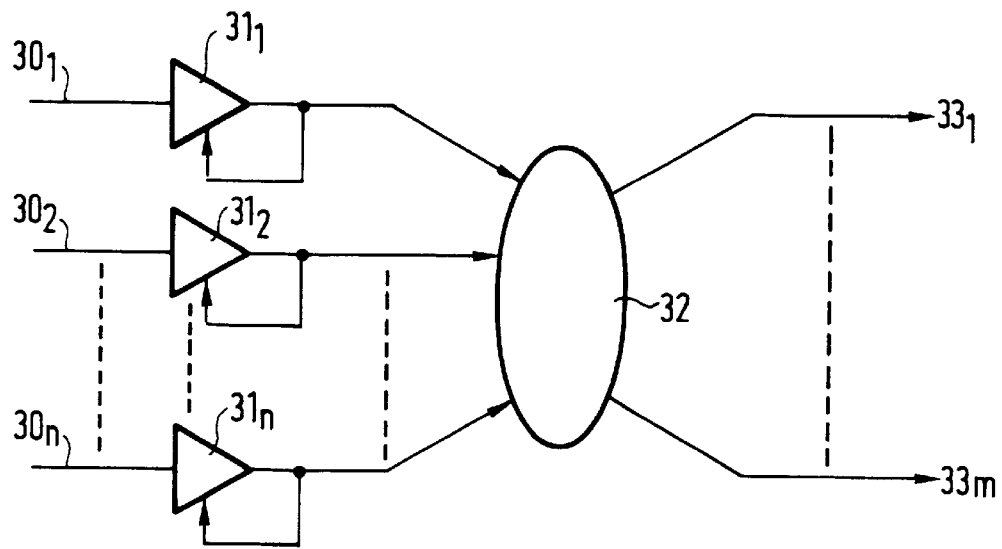
FIG. 3 shows a distribution system of the present invention.

FIG. 3 shows a distribution system of the present invention.

As in the above-described state of the art, optical signals are conveyed over optical links $30_1$ to $30_n$. Each optical signal is constituted, for example, by digital communication or by a time or frequency multiplex of communications channels. The various optical signals are applied to amplifiers $31_1$ to $31_n$ whose outputs are connected to a distributor element 32 constituted by an optical star coupler having at least two inputs and a number m of outputs referenced $33_1$ to $33_m$.

According to the invention, the optical amplifiers $31_1$ to $31_n$ are optical amplifiers whose gains are kept constant. In other words, the gain and thus the amplification of the signals is independent of the observed mean input power. A small amplitude signal is therefore amplified with the same gain as a large amplitude signal. The dynamic range of amplification is therefore identical for weak signals and for strong signals.

Similarly, gain servo-control gives independence from the number of channels conveyed by each link. Thus, the noise of a link is no longer amplified more than the useful signal conveyed by the same link, and a decrease in the mean power at the input of an amplifier does not give rise to a degradation of the S/N ratio on the outputs $33_1$ to $33_m$ of the coupler 32.

The characteristic 12 in FIG. 1 corresponds to the characteristic Ps=f(Pe) of such an amplifier whose gain is kept constant as a function of input power. It can be seen that the slope of this characteristic is constant and that its gain is therefore likewise constant.

The characteristic 21 of FIG. 2 shows the result obtained. Gain is constant regardless of the mean power of the input signal up to a maximum value $Pe_{max}$.

The advantage of the invention over the state of the art is that the noise level at the outputs of the amplifiers is identical from one amplifier to another and said noise level is constant over time, regardless of the input load, providing it is ensured that the amplifiers are identical.

Each amplifier can be made using the technique described in French patent application No. 2 714 982 entitled "Regulated optical amplifier" and incorporated in full in the present application. That document describes a regulated optical amplifier comprising an amplifying waveguide and a loop for servo-controlling the power of spontaneous emission amplified and guided by said amplifying waveguide. The gain of the amplifier is kept constant therein by servo-control, using the reverse-direction emission as the reference and modifying the pumping power applied to the amplifier.

Other techniques for controlling the gain of optical amplifiers are described in the article "Gain control in erbium-doped fiber amplifiers by lasing at 1480 nm with photoinduced Bragg gratings written on fiber ends" by E. Delevaque, T. Georges, J. F. Bayon, M. Monerie, P. Niay and P. Bernage, Electronics Letters, Jun. 10, 1993, Vol. 29, No. 12, pp. 1112 to 1114, and in the article "Gain monitoring of erbium-doped fiber amplifiers by detecting spontaneous emission" by H. Masuda and K. Aida, IEEE Photonics Technology Letters, Vol. 5, No. 9, September 1993, pp. 1017 to 1019. The first article proposes operating the amplifiers under lasing conditions in order to obtain constant gain.

Reference may also be made to U.S. Pat. Nos. 5,117,196 and 5,396,360 which are also incorporated in the present application by reference.

The links $30_1$ to $30_n$ are of the multi-wavelength type, i.e. each conveys a plurality of wavelengths, with each wavelength corresponding to a communications channel. The amplifiers then present an amplification characteristic that is constant as a function of wavelength.

The coupler 32 is conventionally passive and has at least two input accesses.

When use is made of a plurality of optical amplifiers whose gains are kept constant by the lasing effect (see above-mentioned article), it is advantageous to provide for a common optical pumping module to be shared. The amplifiers can then have the same gain (in practice similar gains), and the number of diodes is smaller than the number of amplifiers.

Another way of keeping the gain of each amplifier constant is to provide an additional transmission channel whose power is modified as a function of the addition or removal of other channels. When channels are removed, the power of the signals conveyed by the additional channel is increased by the amount of power that was conveyed by the channels that have been removed, and vice versa.

The optical amplifiers used may equally well be fiber amplifiers or semiconductor amplifiers.

Figure 4:
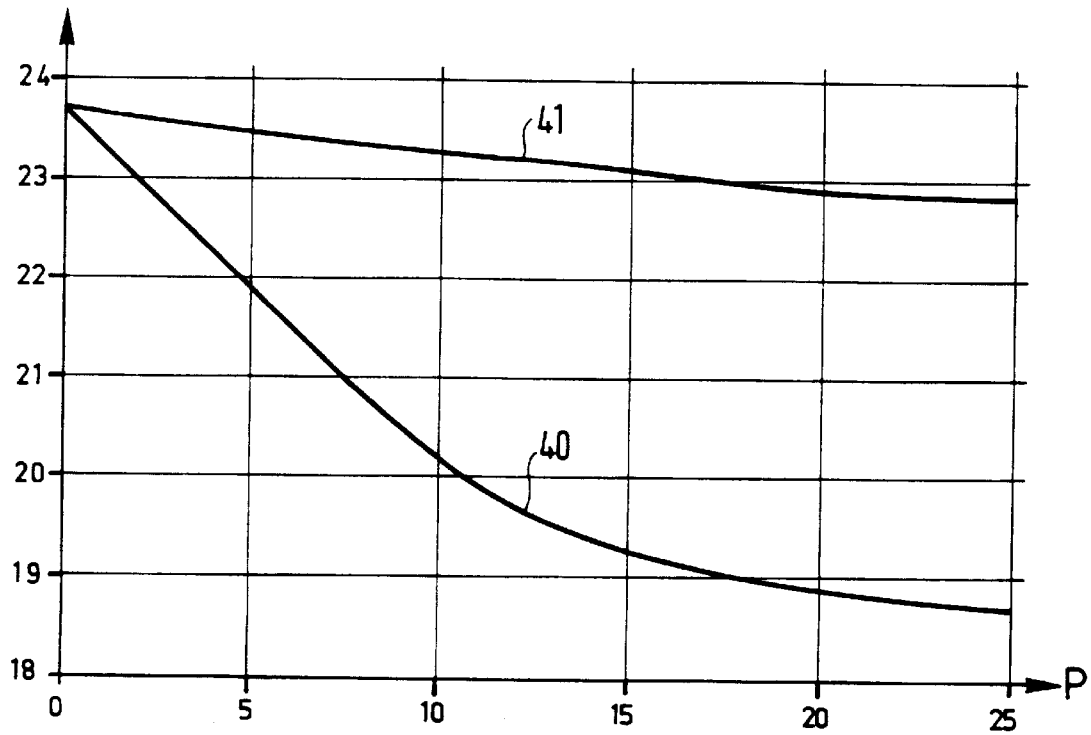
FIG. 4 shows a simulation of the effect on signal-to-noise ratio of controlling the gain of the amplifiers.

FIG. 4 shows a simulation of the effect of amplifier gain control on the S/N ratio. The starting conditions were as follows: an optical star coupler having 16 inputs was considered, with each input receiving an amplified optical signal corresponding to a maximum of 16 wavelength-multiplexed transmission channels. Each amplifier can thus need to amplify 0 to 16 channels, depending on traffic. In FIG. 4, the abscissa corresponds to variation of power P expressed in dB at the inputs of half of the amplifiers, and the ordinate corresponds to the S/N ratio in dB measured over a bandwidth of 1 nm in one channel, at one of the outputs of the optical star coupler.

It can be seen that without gain control (characteristic 40), a 25 dB change in load causes the S/B ratio to drop by 5 dB. With gain control (characteristic 41), the same change in load gives rise to a drop in the S/N ratio of less than 1 dB.

Thus, the use of constant gain amplifiers makes it possible to combine signals from a plurality of ports independently of the amount of information traffic.

We claim:

1. A system for distributing amplified optical signals, the system comprising an optical star coupler having at least two inputs, each input of said coupler being connected to the output of a respective optical amplifier whose input receives a digital signal comprising a variable number of conveyed wavelength division multiplexed channels, wherein said optical amplifiers are optical amplifiers whose gains are kept constant, even when said number of conveyed wavelength division multiplex channels varies.

2. A system according to claim 1, wherein said gains are kept constant by servo-controlling the pumping powers applied to said optical amplifiers.

3. A system according to claim 1, wherein said gains are kept constant by causing said optical amplifiers to operate under lasing conditions.

4. A system according to claim 1, wherein the gain of each of said optical amplifiers is kept constant by varying the power of an additional channel applied to said optical amplifier.

5. A system according to claim 1, wherein said optical amplifiers are fiber amplifiers.

6. A system according to claim 1, wherein said optical amplifiers are semiconductor amplifiers.

* * * * *